United States Patent
Cohen

(10) Patent No.: US 8,270,725 B2
(45) Date of Patent: Sep. 18, 2012

(54) SYSTEM AND METHOD FOR OPTICAL MARK RECOGNITION

(75) Inventor: Jon D. Cohen, Washington, DC (US)

(73) Assignee: American Institutes for Research, Washington, DC (US)

( * ) Notice: Subject to any disclaimer, the term of this patent is extended or adjusted under 35 U.S.C. 154(b) by 785 days.

(21) Appl. No.: 12/320,588

(22) Filed: Jan. 29, 2009

(65) Prior Publication Data

US 2009/0232404 A1    Sep. 17, 2009

Related U.S. Application Data

(60) Provisional application No. 61/006,755, filed on Jan. 30, 2008.

(51) Int. Cl.
G06K 9/48    (2006.01)
G06K 9/00    (2006.01)
G06K 9/62    (2006.01)

(52) U.S. Cl. .................. 382/199; 382/181; 382/209

(58) Field of Classification Search .................. 382/199, 382/209, 190, 181, 305
See application file for complete search history.

(56) References Cited

U.S. PATENT DOCUMENTS

| | | | |
|---|---|---|---|
| 6,970,267 B1 * | 11/2005 | Scanlon | 358/1.4 |
| 2006/0126916 A1 | 6/2006 | Kokumai | |
| 2007/0168382 A1 | 7/2007 | Tillberg et al. | |
| 2008/0018919 A1 | 1/2008 | Ohkawa | |

* cited by examiner

*Primary Examiner* — Daniel Mariam
(74) *Attorney, Agent, or Firm* — Steptoe & Johnson LLP

(57) ABSTRACT

A method for creating a page template corresponding to a form for use in a mark recognition system includes identifying at least one path of traversal across a form, detecting edge transitions along each such path, and creating page template using the detected edge transitions.

10 Claims, 3 Drawing Sheets

SYSTEM AND METHOD FOR OPTICAL MARK RECOGNITION

CROSS-REFERENCE TO RELATED APPLICATIONS

This application claims the benefit of U.S. Provisional Application No. 61/006,755 filed Jan. 30, 2008 and titled "High Precision Mark Recognition Using Visible Light Technology," which application is hereby incorporated by reference in its entirety for all purposes.

TECHNICAL FIELD

The present invention relates generally to optical mark recognition, and, more particularly, to the automated recognition of marks made on forms in a student assessment system.

BACKGROUND

In the student assessment industry, virtually perfect capture recognition of marks is desirable. Several factors mitigate against perfection in this endeavor, including imperfect print quality, imaging distortions, damage to forms in the field, etc.

A common approach to processing forms involves the use of special inks and lighting that causes the pre-printed marks on the page to drop out, leaving only reference marks or timing tracks in a visible ink, along with pencil marks on the page. This approach relies solely on the location of marks on the page relative to the edge of the page, the reference marks or the timing tracks to locate the invisibly captured "bubbles" in which marks may appear. Graphite from a mark in the selected bubble remains visible, and is captured and processed.

Drop-out technologies tend not to provide any indication when damaged, misprinted, crumpled, or otherwise anomalous pages are captured, as long as the reference marks remain in place. For example, imperfections may be introduced by small variations in the speed of travel of the page under the scanner.

SUMMARY

The method, system, and devices described herein may be used with forms printed and scanned in the visible spectrum. Fidelity is achieved by searching for known, distinct targets and failing when they are not found where expected. Application of this method allows use of digitally printed forms, expanding the possibilities for construction of test forms.

In a general embodiment, a method for creating a page template corresponding to a form for use in a mark recognition system includes identifying at least one path of traversal across a form, detecting edge transitions along each such path, and creating page template using the detected edge transitions.

A method in accordance with an embodiment includes characterizing the elements that may appear on pages in advance, defining a template form that records the location of the elements on the page, defining a transformation from template coordinates to page coordinates, and using these characterizations and definitions to identify the specific portions of the document that may have a valid mark.

A system in accordance with an embodiment includes a scanner configured and arranged to optically scan a printed form including marks and a processor configured and arranged to receive information relating to the scanned marks and to characterize the marks by type and location of edges thereof, to define a template form recording location of the characterized marks, to define a transformation from a template coordinate system to a page coordinate system, and to use the characterized marks, the defined transformation, and the defined template to identify portions of the form that include valid user-applied marks.

A machine-readable medium in accordance with an embodiment includes machine-executable instructions for performing the method of controlling the systems describe herein.

Further features of the present invention, as well as the structure and operation of various embodiments of the present invention are described in detail below with reference to the accompanying drawing.

BRIEF DESCRIPTION OF THE DRAWING

For a more complete understanding of the present invention, and the advantages thereof, reference is now made to the following description taken in conjunction with the accompanying drawings.

DETAILED DESCRIPTION OF ILLUSTRATIVE EMBODIMENTS

Figure 1:
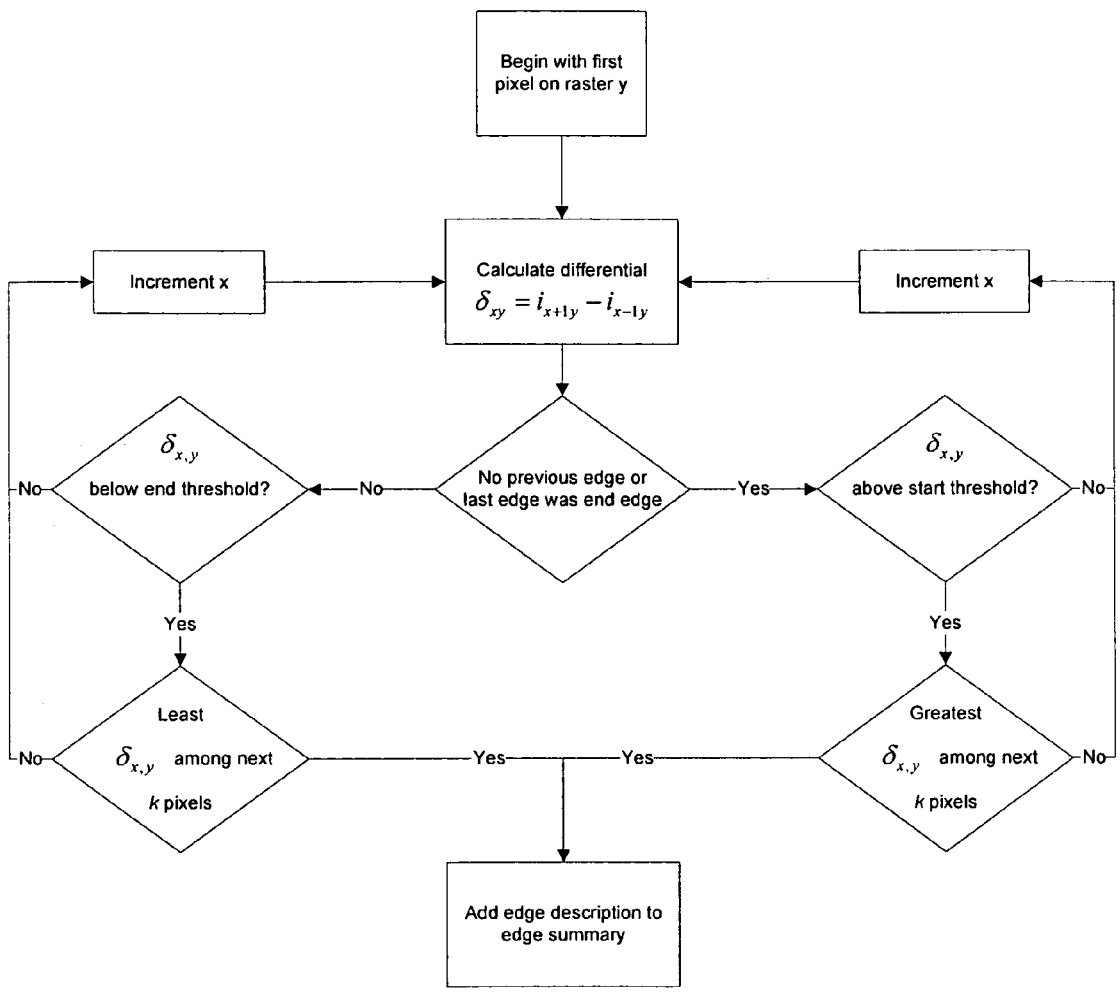
FIG. 1 is a flow chart of a method for building edge summaries.

Optical mark recognition systems are widely used in the student assessment industry to automate test scoring. Conventional systems typically use pre-printed forms with a portion of the forms (e.g., bubbles and certain other marks and information) printed in a color or using a special ink that can be "dropped out" of scanned images. In this manner, forms that have been marked (such as by a student during a testing session) may be scanned in such a manner that captured images display only marks made by the student, and certain other marks (such as, those marks used for registration and alignment). There is a need for improved performance in optical mark recognition systems when processing forms that are not in the condition expected, such as those that have been damaged, misprinted, or crumpled, those containing stray marks, and the like.

A method in accordance with an embodiment may be used, for example, with digitally printed material. A scanned image of printed material is analyzed as a collection of discrete elements assembled onto a page(s) and corresponding to a template. The template includes at least a representation of certain elements that are present on a blank form. Using the template, it is possible to evaluate marks, excluding pre-printed marks, in a region of interest for purposes of mark recognition.

By way of example, consider a preprinted form including square marks in the corners of the form, circles with letters in them, and lined or cross-hatched areas for constructed responses. A template is provided that identifies the various elements. Using the template, it is possible to identify marks made on the pre-printed form, and the locations of those marks. A template may be created, for example, by characterizing each atomic element by the type and location of its edges, and assembling such characterizations and locations.

A template may be matched to a scanned (or otherwise captured) form, and used to identify marks made on the pre-printed form within a region of interest. Further, the template may be used to exclude pre-printed marks from a captured form.

In a preferred implementation, several basic operations form the basis for mark scoring and mark detection, which are discussed subsequently.

Job Elements

The scanning job can consist of a number of different types of marks, which we call job elements. Our proposed method makes use of the presence of some marks used as reference marks. Typically, though not necessarily, these marks are located near the corners of the pages. Other important types of elements include bubble sets and response spaces, but the technology is applicable to a wider range of possible elements.

Reference marks are used to register the page and match it to the template. With a set of reference marks on the page template and a corresponding set of reference marks on the scanned image, the coordinates of one set of reference marks can be projected onto the other. Other methods of mapping points on the template to points on the page are available and found in the literature.

Edge Summaries

A job element can be summarized as a set of edge descriptions. Each horizontal and vertical raster of the image can be represented as an ordered list, array, or other collection of edge descriptions, with each edge description carrying information about (a) the offset of the edge from the beginning of the raster, and (b) the edge type. The edge type indicates whether the edge signals the start of a mark or the end of a mark.

Many edge detection algorithms are available in the literature. Any edge detection method that preserves information about the edge type may be used to create the edge summary. For example, detecting a vertical edge can be accomplished by the algorithm summarized in FIG. 1.

Figure 2:
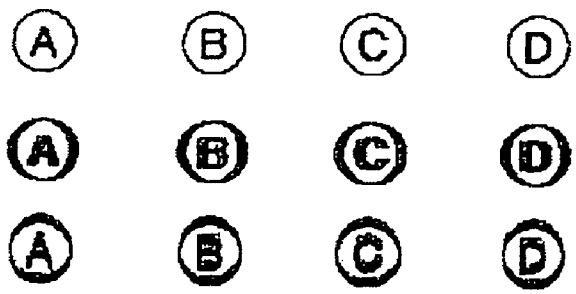
FIG. 2. depicts edges of a bubble set along with corresponding edge summaries along two axes.

The images in FIG. 2 highlight the start and end edges along the x and y axes. Edges marked in green identify the start of a light, and edges marked in red the end. Here edges are taken as dark-to-light (light grey) and light-to-dark (dark grey), but the transition could be by color or other characteristic.

Edge summaries represent an image using very little space, and can be used to match against an image checking a very limited number of points. Therefore, they are efficient from both a space and speed perspective.

Page Templates

Page templates can be built as collections of job elements characterized by edge summaries. Each job element can be associated with a location on a page. This can be represented in computer memory, a database, a text file, or other media.

Matching Templates

The matching of a template to the page image to be processed happens in three stages: (a) mapping of coordinates on the template to coordinates on the scanned page; (b) adjustment of the location of job elements on the scanned page because of imperfect image capture; and (3) authentication of the expected job element at the prescribed location. The mapping of the coordinates to the template can be accomplished by a variety of mechanisms found in the image processing literature. The most straightforward is a simple projection. Let p represent a 3×k matrix comprised of column vectors containing the {x,y,1} coordinates of the reference marks on the scanned page, and t represent the corresponding matrix of points from the matrix. Typically, k is 4.

We can write $\rho T = \Gamma P$, where $\rho$ is a scalar scale factor and $\Gamma$ is a 3×3 transformation matrix. Solving these equations yields the transformation matrix such that $$\Gamma = \begin{bmatrix} A & B & C \\ D & E & F \\ G & H & 1 \end{bmatrix}.$$

Without the scale factor, these matrix equations yield with 4 points yields 8 equations with 8 unknowns. When the number of points is extended, a psuedo-inverse can replace the inverse in the solution to the equations.

While projection is the most straightforward approach to aligning the scanned page with the template, other approaches may work with the methods outlined here.

Adjustment and Authentication

One of the risks encountered in high-precision mark recognition is the possibility that irregularities in the paper, print, capture, or handling of the document the field will damage the match between the page and template. In these cases, existing mark recognition software may capture information from the wrong spot on the page. Embodiments described here may reduce or eliminate this possibility.

The match between a captured image of a page and a template is never perfect, even after mapping the coordinates of the template and the scanned page. Field curvature due to optics of lenses, variations in scanner belt speed, and other mechanical and optical factors can lead to minor variations in the geography of the pages.

Figure 3:
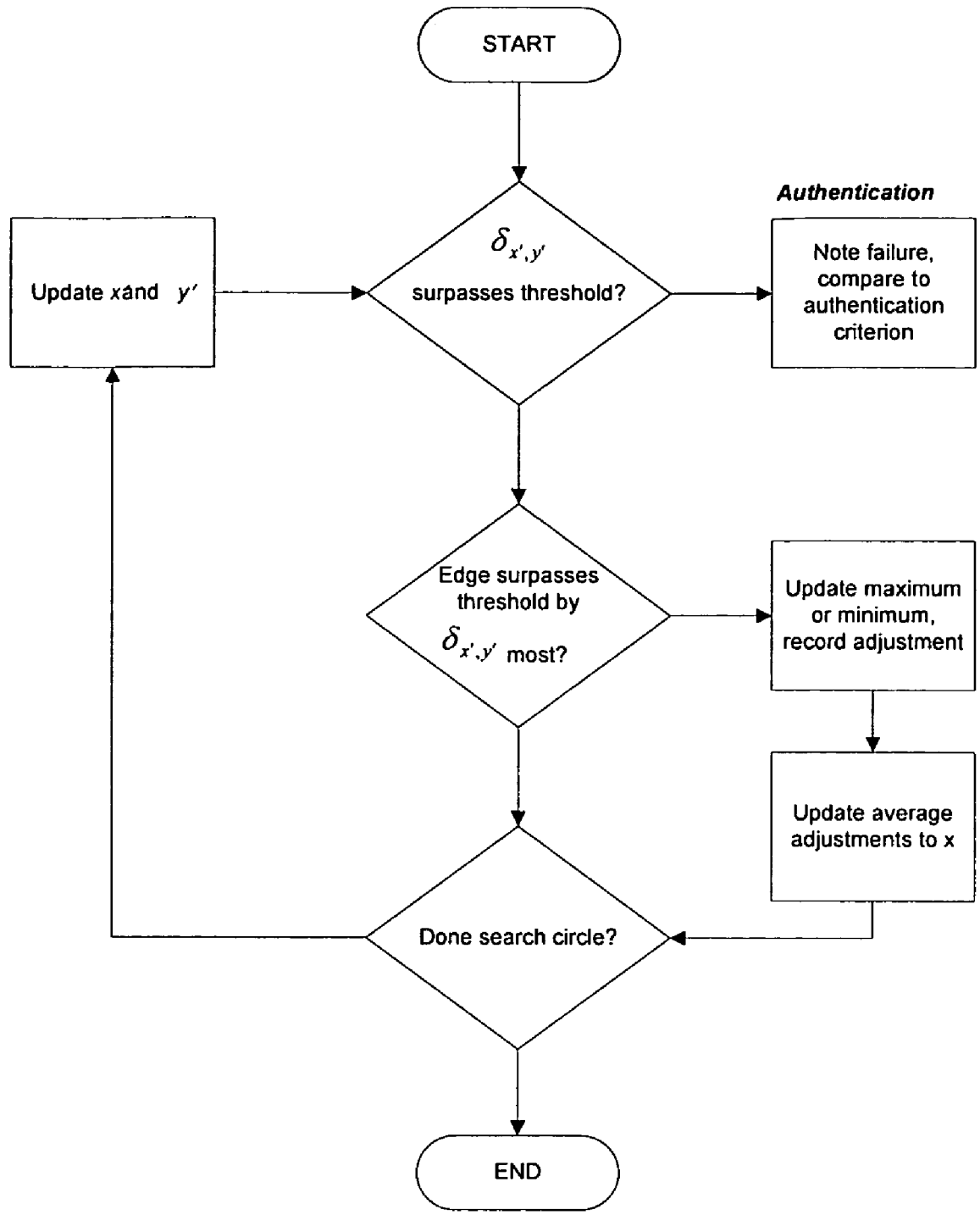
FIG. 3 is a flow chart of a search procedure for use in mapping and authenticating page templates.

In order to address these issues, a method in accordance with an embodiment searches a very small region for the best match between the template edges and the edges found on the page. For each edge, the method performs the search illustrated in FIG. 3. The horizontal adjustments are based on an average adjustment of the search process across horizontal rasters, and the vertical adjustments are based on an average adjustment calculated for the vertical rasters.

The authentication routine establishes business rules that define the criteria for failure of the authentication routine, and the return result prevents the system from proceeding if authentication fails. For example, in bubble sets, some of the edges may be destroyed by intentional marks on the page, so the business rules may take this sort of heuristic into account.

Scoring Bubbles

Often bubbles are scored on a grey-scale. When scoring bubbles, the grey-scale is measured in the areas within the defined bubble area and not in (a) the printed marks outlined by the edge summaries or (b) the blur region around that. FIG. 4 shows a color-coded example, where the dark grey/black marks the blur regions and the lighter grey marks the area that holds potential marks. The area covered by the pre-printed letters can be ignored, or an interpolation routine can sample the grey-levels of surrounding pixels.

Using the approach described in the next section, light marks detected in bubbles can be evaluated to determine whether they contain student marks.

Mark Detection

It can be challenging to identify blank documents from those that have been marked. A method in accordance with an embodiment offers a mechanism to make this determination. If response spaces are defined on the page template, they can be located and authenticated. Once their coordinates are fixed, they can be searched for marks meeting various criteria.

The search begins on a raster, which may be selected to be horizontal or vertical, as desired and continues across until a pixel with intensity beyond the threshold is reached. If the search is for a mark of a required width contiguous for a require length, the mark can be traced using the following algorithm:

trace the length of the qualifying marks across the raster;
search for a horizontal line of the required length;
check the subsequent raster for qualifying marks of at least the length less one
if this is found, repeat;
if a line of sufficient length is not found, recursively check the subsequent pixels for a qualifying mark;
if during the search you encounter a pre-printed line, terminate the search;
search for a vertical or diagonal line;
for each horizontal raster:
  for each pixel:
    Recursive Loop A:
      if the required length is zero, a mark has been found and terminate the recursion;
      if the point is within a mark defined by the edge summary, return false;
      if pixel x is a qualifying mark, trace the horizontal mark for its length m;
      on the next raster, y+1 move backwards to x−w+1, where w is the width of the required mark;
      while x remains less than x+w+m;
        if a line of the required width is found reenter Recursive Loop A beginning with the first found x, y+1, and searching for a line of required-length-1;
        if the recursion returns true, return true;
        otherwise increment x; and
      return false.

A system for executing the described methods may include a general purpose or purpose-built computer that includes an input bus configured and arranged to allow input of data relating to scanned forms and a processor configured and arranged to execute method steps as described herein. Optionally, the computer may include a memory for storing template definitions and/or scanned data. Likewise, the computer may include a user interface such as a graphical user interface and input and output devices such as keyboard, mouse, printer, I/O ports such as USB ports and the like.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for creating a page template corresponding to a form for use in a mark recognition system, the method comprising:
   identifying at least one path of traversal across a form;
   identifying a set of reference marks wherein the set of reference marks defines a frame of reference for a page and matches the page to the template;
   for each path of the identified at least one path of traversal, detecting edge transitions along said path, and defining an edge summary using the detected edge transitions; and
   creating a page template using the edge summary for each of the paths of traversal across the form.

2. The method of claim 1, wherein identifying at least one path of traversal across a form includes identifying one or more straight lines traversing the form.

3. The method of claim 1, wherein the paths of traversal are defined by crossing horizontal and vertical lines.

4. The method of claim 1, wherein detecting edge transitions includes identifying a light-to-dark transition.

5. The method of claim 4, wherein the light-to-dark transition identifies the beginning of a mark.

6. The method of claim 1, wherein detecting edge transitions includes identifying a dark-to-light transition identifying the end of a mark.

7. The method of claim 1, wherein the page template includes an edge summary and a location for each of the identified at least one paths of traversal.

8. A method for recognizing a mark on a form in a mark recognition system, the method comprising:
   recognizing a set of reference marks on a page, wherein the set of reference marks defines frame of reference for the page and matches the page to a template;
   determining a projection to transform between the frame of reference for the page and a frame of reference for the template utilizing coordinates of said reference marks, where the template includes one or more targets for mark recognition;
   adjusting location of imperfectly captured marks;
   for each target of the one or more targets for mark recognition, search within a region to determine if a mark is present at such target, using the projection to transform between target locations in the template frame of reference and corresponding locations in the page frame of reference, and recording the result of the search.

9. The method of claim 8, wherein determining if a mark is present at such target includes authenticating such target by applying criteria to evaluate the extent of a match.

10. The method of claim 8, further comprising excluding pre-printed marks defined by the template.

* * * * *